United States Patent [19]

Cutler

[11] Patent Number: 5,407,357
[45] Date of Patent: Apr. 18, 1995

[54] ELECTRONIC TESTING DEVICE FOR USE WITH EDUCATIONAL BOOKS

[75] Inventor: Burton Cutler, Rolling Hills, Calif.

[73] Assignee: Educational Insights, Inc., Dominguez Hills, Calif.

[21] Appl. No.: 85,414

[22] Filed: Jun. 30, 1993

[51] Int. Cl.⁶ .................................................. G09B 5/00
[52] U.S. Cl. .................................. 434/335; 434/308; 434/317; 434/322
[58] Field of Search ............... 434/317, 339, 359, 308, 434/322, 327, 335, 353, 362; 364/419.01

[56] References Cited

U.S. PATENT DOCUMENTS

| | | | |
|---|---|---|---|
| 3,592,098 | 7/1971 | Zadig | 434/339 X |
| 4,044,229 | 8/1977 | Samreus | 434/359 X |
| 4,552,536 | 11/1985 | Kay et al. | |
| 4,604,065 | 8/1986 | Frazer et al. | |
| 4,636,881 | 1/1987 | Brefka et al. | 434/317 X |
| 4,703,573 | 11/1987 | Montgomery et al. | 434/317 |
| 4,773,860 | 9/1988 | Gannaway et al. | |
| 4,809,246 | 2/1989 | Jeng | 434/317 |
| 4,854,879 | 8/1989 | Chang | |
| 4,884,974 | 12/1989 | DeSmet | 434/317 |
| 4,990,093 | 2/1991 | Frazer et al. | |
| 5,122,062 | 6/1992 | Cutler et al. | |
| 5,167,508 | 12/1992 | McTaggart | 434/317 |
| 5,226,822 | 7/1993 | Morris | 434/317 |

*Primary Examiner*—Richard J. Apley
*Assistant Examiner*—Glenn E. Richman
*Attorney, Agent, or Firm*—Price, Gess & Ubell

[57] ABSTRACT

The present invention provides an electronic testing device for use in responding to questions of quizzes periodically provided in an educational text book. The testing device itself comprises a rectangular housing either permanently or removably affixed to the back cover of the book, an input section for entering selected answers corresponding to the questions, a logic section for comparing the selected answers with correct answers programmed into memory and an output section for providing immediate and enjoyable audio-visual feedback to the user. In a first embodiment of the present invention, the device comprises a small and compact rectangular housing adapted for permanent affixation or removable attachment to a protruded edge of the back cover of a specific educational book. Alternatively, the device may form a small, portable unit that can be detached from the book for use with quizzes of a plurality of different text books. In this alternative embodiment, the device includes an alphanumeric keypad in addition to an LCD display screen for entering and displaying both letter and number sequences which form the specific answer strings required by a particular quiz. The logic section comprises a programming mode for programming the correct answers of a plurality of quizzes contained in different text books and a testing mode for comparing the user selected answers with the correct answers of an identified quiz. The device may further comprise a data transfer mode for transferring the programmed data of one device to another device upon coupling of the two devices together so as to facilitate the use of the device by a large number of students.

13 Claims, 7 Drawing Sheets

ELECTRONIC TESTING DEVICE FOR USE WITH EDUCATIONAL BOOKS

BACKGROUND OF THE INVENTION

1. Field of the Invention

The present invention relates to the field of educational and amusement devices, and more particularly, to the field of electronic testing devices for use with educational books.

2. Prior Art

Each day in our schools, students confront the rigors of having to complete homework assignments and exams by means of answering text book questions appearing at the end of each chapter in the book. The students turn to the assigned pages and read through the questions, answering them on separate sheets of paper. If a student is completing a homework assignment, he may turn to the back of the textbook after writing down his answers to compare them with those written therein. On the other hand, if the student is taking a quiz or completing a homework assignment to be turned in to the teacher, he must wait for return of his answer sheet before he can find out how well he did.

However, students regard this conventional testing method as boring due to the lack of an interactive quiz format or process from which they can derive immediate and entertaining feedback for reinforcing that which they have learned. Students are therefore prevented from maximizing their comprehension of the subject matter being tested because of a lack of motivation caused by their perception of conventional testing methods. In attempting to remedy this pervasive problem in the educational field, several testing devices have been developed for use with special quiz or textbook formats so as to enhance the otherwise routine task of writing down a formulated answer and comparing it with the correct answer on another page of the text book.

In U.S. Pat. No. 4,552,536 issued to Kay et al., a programmed learning textbook is provided with self-testing quiz formats having several questions and a plurality of possible answers adjacent to each question. Next to each possible answer is a mottled design printed on the paper to conceal underlying indentations which distinguish the correct answers from the wrong answers. In order to determine whether a selected answer is correct, the student touches the mottled design and feels for specific indentations which indicates the correctness of the selected answer. Similarly, U.S. Pat. Nos. 4,604,065 and 4,990,093 both issued to Frazer et al. disclose a teaching apparatus consisting of a detector pen for use in discriminating between areas on a printed substrate which may be adapted to the question and answer areas of a worksheet or book. The pen senses the non-visual, magnetic properties of the different areas to indicate whether a correct or incorrect answer has been selected. The pen also displays the results for each question and/or for a plurality of questions making up a test. Furthermore, U.S. Pat. No. 4,854,879 issued to Chang et al. discloses a self-teaching book having a number of questions and a number of electronic units on which a plurality of answers corresponding to each question are displayed for the user to choose from. Each electronic unit comprises several conducting, insulating and source layers which form an answer sheet for the detection of correct and incorrect answers when the user presses a particular unit to indicate his selection. A plurality of slots are respectively disposed in the insulating layers so as to permit electrical contact between the conducting and source layers for activating the electronic device upon pressing a selected possible answer.

In each case, the mundane task of quiz taking is made more interactive and enjoyable because of the immediate feedback provided by each of the aforementioned devices. Nonetheless, these devices are limited in their application and utility because they require the use of specially manufactured books or materials for implementing the detection surfaces which indicate whether an adjacent, possible answer is correct. Furthermore, these devices cannot be utilized with pre-existing books and materials since such preexisting materials are not manufactured with the detection surfaces necessary for detecting the correctness of the selected answers.

In an analogous field, several teaching and testing devices, such as those in U.S. Pat. No. 4,773,860 issued to Gannaway et al. and U.S. Pat. No. 5,122,062 issued to Cutler et al., have been implemented in the form of a housing that holds attached information cards having question and answer data displayed thereon. In both cases, the user selects an alphanumeric character printed on the information card representing a possible answer to a question also displayed on the card. The character is input to a microprocessor via either an input keyboard or an electrical probe used to activate electrical contacts in the housing. As the user answers each question, the device produces audio and/or visual output indicating correctness of the user's selection, and at the end, outputs test statistics representing the user's final score in answering all the questions on the information card.

A major drawback with such devices exemplified by the aforementioned references, however, is that they rely on specially developed information cards to present the question and answer data to the user. Accordingly, these devices cannot be utilized in testing the specific information presented in a particular pre-existing text and are generally more expensive because of the additional costs involved in development of the information cards. These difference are very important with respect to utilizing such devices in classroom settings since it is desirable to provide a cost effective means for testing the students with specific information provided in the textbooks being utilized in the class so as to provide a unified program in which the students read a chapter of the text and subsequently answer questions directly related thereto.

Accordingly, it is an objective of the present invention to provide an electronic testing device for use with a programmed text book having a plurality of quizzes to test the reading comprehension of the user by comparing user selected answers entered into the device with corresponding correct answers stored in memory and to provide audio-visual feedback representing the correctness of the selected answers.

It is another objective of the present invention to provide an electronic testing device having a small and compact rectangular housing adapted for either permanent affixation or removable attachment to a protruded edge of the back cover of a text book.

It is yet another objective of the present invention to provide an electronic testing device having a small and compact rectangular housing rotatably coupled to the back cover of a text book for rotation between an operating position adjacent to an edge of the book and a stored position within a storage recess of the back cover.

It is a further objective of the present invention to provide an electronic testing device for use with a plurality of quizzes of a plurality of different educational books, the device comprising a logic section having a first programming mode for programming the correct answers of a plurality of quizzes from different books and a second testing mode for selecting questions of an identified quiz, comparing user selected answers with the correct answers of the identified quiz and outputting a response signal to the display means and audible means of an output section for indicating the correctness of the user selected answers.

It is still a further objective of the present invention to provide an electronic testing device for use with a plurality of quizzes of a plurality of different educational books, the device comprising an alphanumeric key pad for entering both correct answers and user selected answers comprising a variety of character strings and an LCD or LED display screen for displaying both types of answers in addition to text designators and quiz codes for identifying a particular quiz of a particular text book.

BRIEF SUMMARY OF THE INVENTION

The present invention provides an electronic testing device having a rectangular housing either permanently or removably affixed to the back cover of the book, an input section for entering selected answers corresponding to the questions, a logic section for comparing the selected answers with correct answers programmed into memory and an output section for providing immediate and enjoyable audio-visual feedback to the user.

In a first embodiment of the present invention, the device comprises a small and compact rectangular housing adapted for permanent affixation to the back cover of a specific educational book. The book comprises a back cover having a protruded edge extending beyond the edges of the pages for mounting of the device thereon adjacent to the edge of the book. The device may also be coupled to the back cover of the book so that it is rotatable between an operating position adjacent to and flush with the front cover of the book and a stored position between the front and back covers of the book. The device may also be slidably mounted to the back cover using corresponding track and guide members. Alternatively, the device may form a small, portable unit that can be detached from the book for use with quizzes of a plurality of different text books.

With respect to the operation of the electronic testing device, a quiz code provided with each quiz is entered using the input keys and a plurality of LEDs sequentially disposed in a vertical arrangement along the side of the device to indicate which one of a plurality of questions similarly arranged in the book is to be answered first. Alternatively, an LCD screen may be used to display the number of the selected question. The logic section randomly and briefly lights all the LEDs with accompanying random sounds (i.e. in a random search mode). It then randomly selects one of the questions for the user to answer and continuously flashes the corresponding LED adjacent to that question. The user then reads the designated question and selects one of the possible answers by pressing the input key having the same letter as the selected answer. The logic section compares the selected answer with the correct answer permanently stored in memory. If the answer is correct, a speaker and associated circuitry play a "right answer" musical tune and the logic section subsequently enters the random search mode again so as to select another question at random after a period of random flashing of all the LEDs accompanied by the random sounds. If a wrong answer is selected, the speaker plays a "wrong answer" musical tune, and after a period of random LED lighting and sounding, the logic section selects the next question to be answered by lighting the associated LED.

The user continues to answer the questions until all of them have been answered either correctly or incorrectly. If all questions have been answered correctly, a full "victory" musical tune is played, whereas if not all the questions are answered correctly, a partial victory song is played. The device then displays all questions answered incorrectly by sequential lighting of their associated LEDs so as to indicate the user's score and the particular questions incorrectly answered. Alternatively, the device may display the correctly answered questions if so desired. After a short time in the random search mode, the device then randomly selects the incorrectly answered questions one at a time for the user to try his aptitude again. This reselection of the incorrectly answered questions continues until all of the questions have been correctly answered, at which time a "full victory" musical tune is played and all question-indicating LEDs are sequentially illuminated several times.

For use of the testing device with a plurality of different text books, an alphanumeric keypad having a plurality of keys and an associated shift key in addition to an LCD or LED display screen are provided for entering and displaying both letter and number sequences as input to formulate the specific answer strings required by a particular quiz. The logic section comprises a programming mode for programming the correct answers of a plurality of quizzes contained in different text books and a testing mode for comparing the user selected answers with the correct answers of an identified quiz. The device may further comprise a data transfer mode for transferring the programmed data of one device to another device upon coupling of the two devices together by means of a cable or adapter.

BRIEF DESCRIPTION OF THE DRAWINGS

The objects, features and advantages of the present invention will become apparent from the following detailed description of the preferred embodiment in which.

DETAILED DESCRIPTION OF THE INVENTION

The present invention provides an electronic testing device for use in responding to questions of quizzes periodically provided in an educational book. The testing device itself comprises a rectangular housing either permanently or removably affixed to the back cover of the book, an input section for entering selected answers corresponding to the questions, a logic section for comparing the selected answers with correct answers programmed into memory and an output section for providing immediate and enjoyable audio-visual feedback to the user. In the following description, numerous details such as specific materials, structures, processes and operating procedures are set forth in order to provide a more complete understanding of the present invention. However, it is understood by those skilled in the art that the present invention can be practiced without these specific details. In other instances, well-known materials, procedures, electronic circuits, methods of operation and the like are not set forth in detail in order to avoid unnecessarily obscuring the present invention.

I. NATURE OF THE INVENTION

Figure 3:
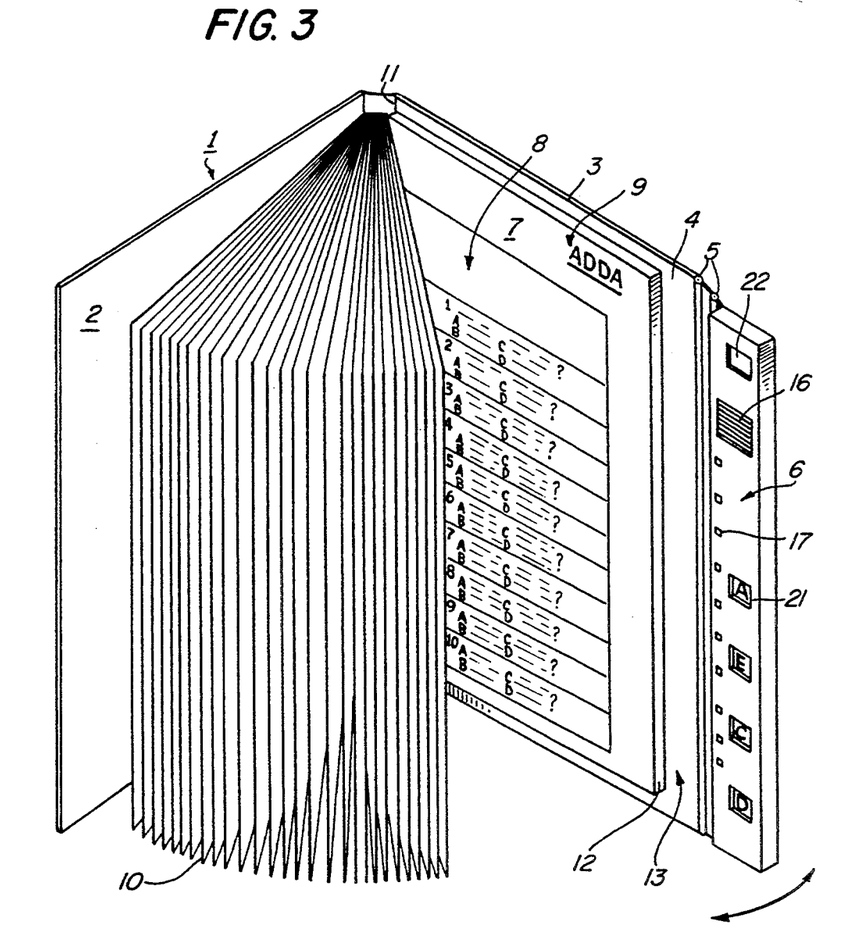
FIG. 3 is a right side perspective view of the electronic testing device with the book displayed in an open position, the testing device being rotatably coupled to the back cover of the book for movement between a storage position where it is stored within a recess of the back cover and an operating position where it is adjacent to the right side of the book.

The electronic testing device of the present invention is designed so that it may be utilized in a variety of manners for different purposes. Specifically, in a first embodiment shown in FIG. 1, the device comprises a small and compact rectangular housing 6 manufactured from plastic, aluminum or the like which is adapted for permanent affixation to the back cover 3 of a specific educational book 1 by means of an adhesive or fasteners. The book 1 comprises a front cover 2, a back cover 3 and pages 10 interposed therebetween which are held in the book 1 through the use of a binding 11 that couples the front and back covers 2,3 together. The back cover 3 preferably comprises a protruded edge or flange 4 extending beyond the edges of the pages 10 for mounting of the device such that the device is directly adjacent to the book 1 opposite its binding 11 and is of approximately the same thickness as the book 1 when the book 1 is closed. In this manner, the device is conveniently exposed at the side of the book 1 for use with the quizzes 7 appearing throughout the book 1, such as the quiz 7 shown in FIG. 3.

Figure 4A:
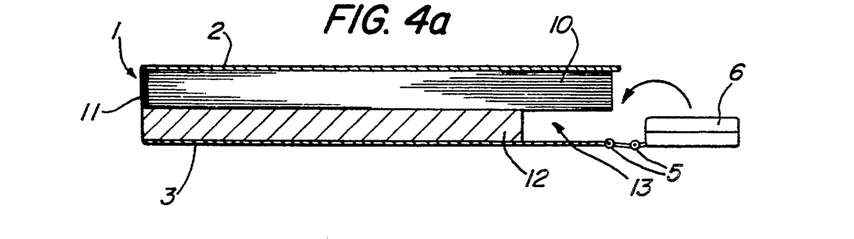
FIG. 4a is a bottom view of the electronic testing device showing the use of a hinged coupling to the book and the use of an embossed portion of the back cover of the book to provide a storage recess for the device.
Figure 4B:
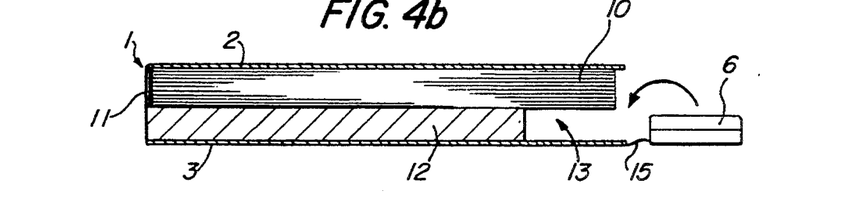
FIG. 4b is a bottom view of the electronic testing device showing the use of a tethered coupling to the book and the use of an embossed portion of the back cover of the book to provide a storage recess for the device.
Figure 6:
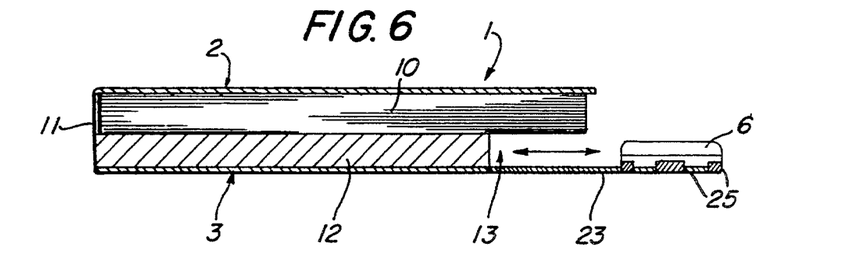
FIG. 6 is a bottom view of the electronic testing device showing a particular embodiment where the device is slidably coupled to the back cover of the book by means of corresponding track and guide members arranged perpendicular to the binding of the book.

In order to protect the device from destruction or malfunction resulting from wear and tear, the device may also be mounted to the back cover 3 in such a way that it can be stored within the area defined by the dimensions of the book 1. According to one configuration shown in FIGS. 3, 4a and 4b, the device is coupled to the back cover 3 of the book 1 so that it is rotatable between an operating position adjacent to and flush with the book 1 and a stored position between the last page of the book 1 and the back cover 3. This rotatable mounting may be accomplished through the use of hinges 5 or a flexible coupling such as an elastic ribbon, a flexible strip of fabric 15, a creased plastic portion of the housing 6 and the like. With this configuration, the back cover of the book 1 preferably comprises an embossed portion 12 having a storage recess 13 formed at the edge adjacent to the device for receiving and protecting the rectangular housing 6 when it is rotated to the stored position. Alternatively, as shown in FIG. 6, the device may be slidably mounted to the back cover 3 using corresponding track and guide members 23,25 for movement of the device perpendicular to the binding 11 of the book 1 between the stored position (within the recess 13 of the embossed portion 12 of the back cover 3) and the operating position. These track and guide members 23,25 would be affixed to the back cover 3 within the recess 13 and the bottom of the device, respectively, in a perpendicular arrangement to the binding 11 of the book 1.

In another embodiment shown in FIGS. 3, 4a, 4b and 5, the device may alternately form a small, portable unit that can be detached from the book 1 for use with other educational books 1 or separate quiz materials which, for example, may be handed out in class by the teacher as an examination. According to the aforementioned configuration using hinges 5 for rotatably coupling the device to the book 1, each hinge 5 can be adapted with two cooperating teeth members, one member being affixed to the device and having an axial pin, and the other member being affixed to the book 1 and having a reception slot for the pin such that the device is detachable from the book 1 by axial separation of the two teeth members.

Figure 5:
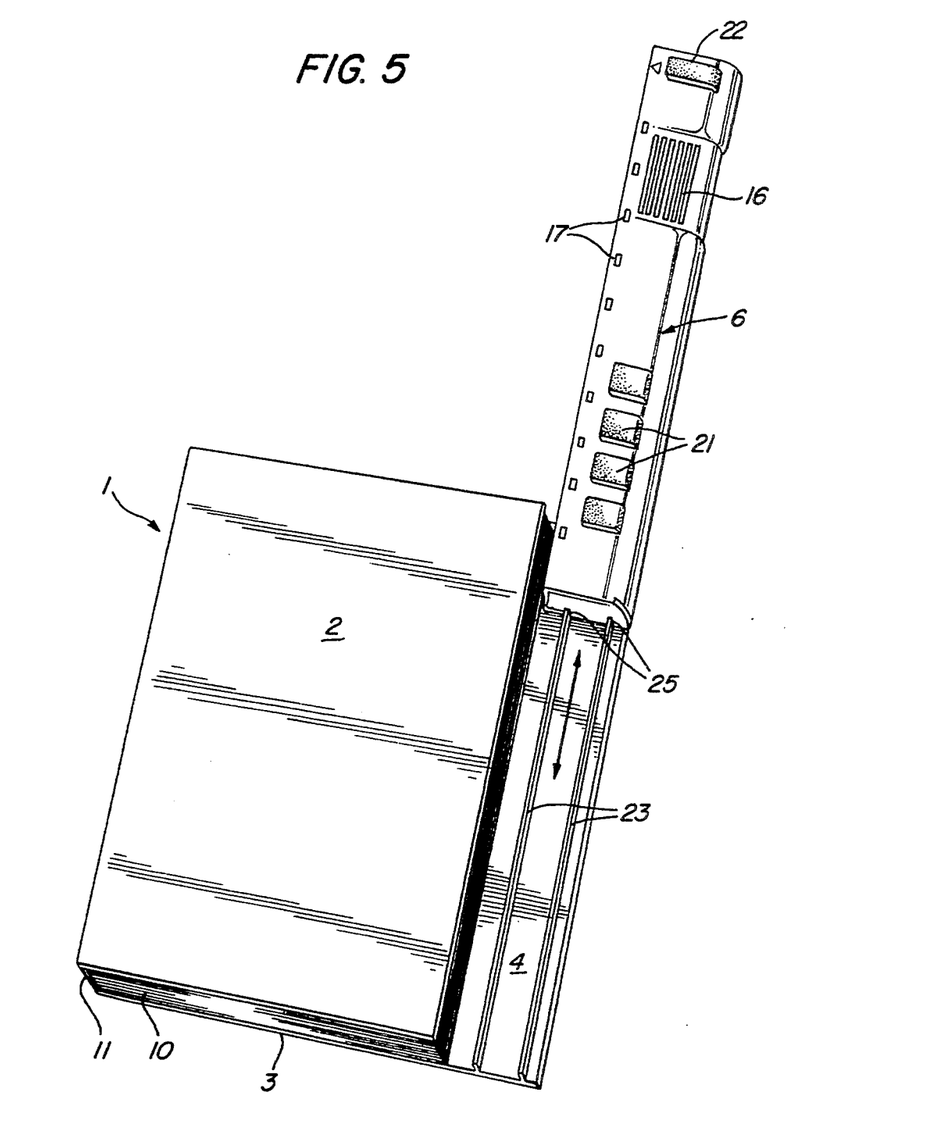
FIG. 5 is a front perspective view of an electronic testing device separable from the educational book by means of corresponding track and guide members arranged parallel to the binding of the book.

With respect to the configuration using a flexible strip of material 15, corresponding flaps of hook and loop fasteners can be employed so as to permit both rotation of the device between the stored and operating positions and detachment of the device from the back cover 3 by separation of the two flaps. With respect to the use of corresponding track and guide members 23,25, a catch lever and release button may be implemented to permit complete detachment of the device from the book. Similarly, as shown in FIG. 5, the corresponding track and guide members may be mounted to a protruded edge 4 of the back cover in a parallel arrangement with the binding 11 of the book 1 where the device could be slidably detached (by vertical movement) from the protruded edge 4 with the assistance of a catch lever and release button. With this arrangement, the protruded edge 4 could then be disposed of by folding it inside the book.

Figure 10:
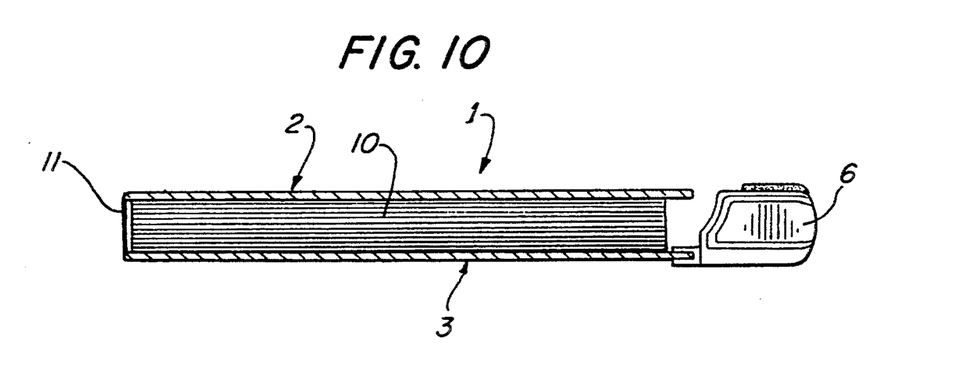
FIG. 10 is a bottom view of the electronic testing device showing a sliding clip.

Additionally, the device may be adapted with clips or sliding clamps protruding from its left side (as shown in FIG. 10) for attachment to the back cover of any book having a hard cover. In this manner, the edge of the back cover is simply inserted into the clips so as to firmly hold the device adjacent to the edge of the book. By using the aforementioned configurations, such a detachable testing device may then be employed with a variety of books, for example, by providing a single testing device with several books forming a series of related topics wherein the device may be separately attached to each topical book.

II. CONSTRUCTION AND OPERATION OF THE DEVICE

Figure 1:
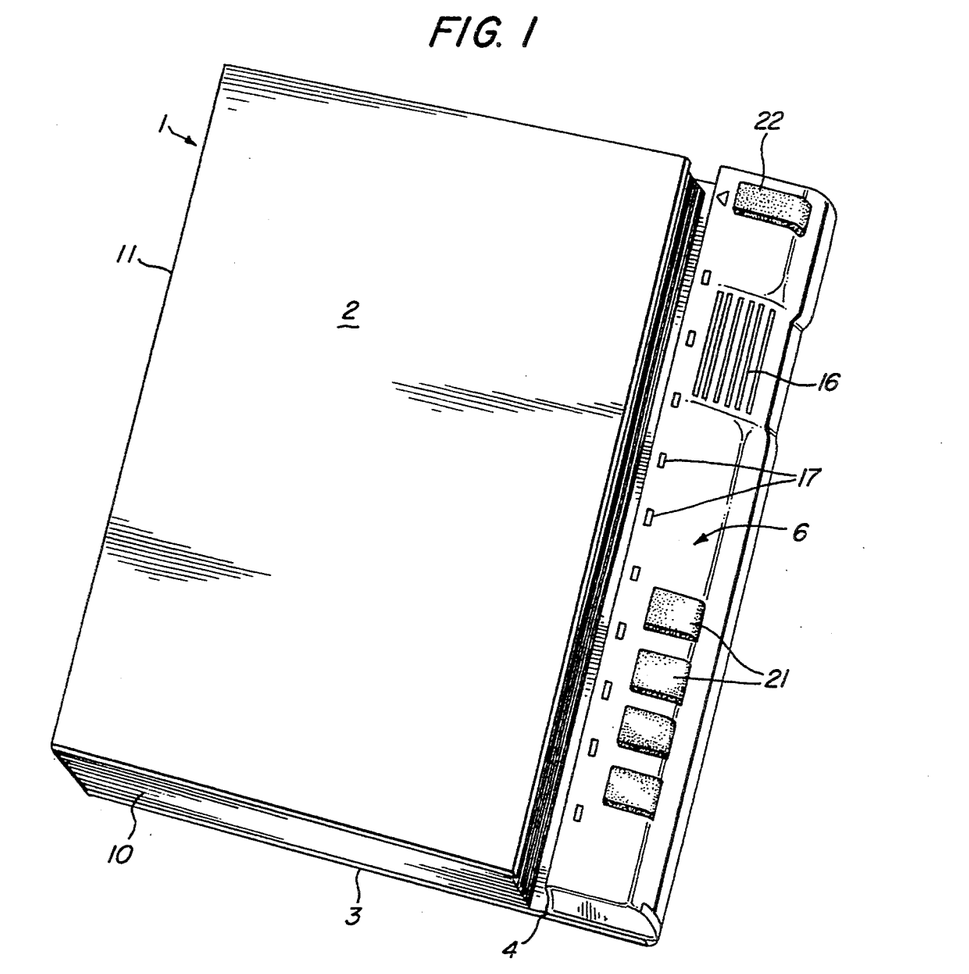
FIG. 1 is a front perspective view of the electronic testing device affixed to the back cover of an educational book for integral use with the quizzes inside the book.
Figure 2:
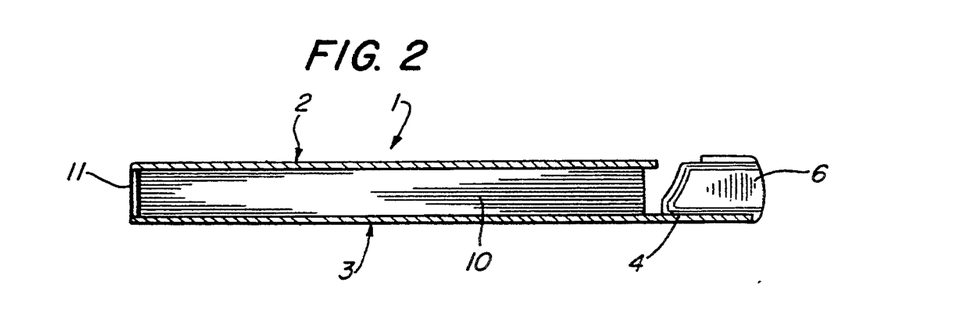
FIG. 2 is a bottom view of the electronic testing device of FIG. 1 showing its affixation to the back cover of the book where it is adjacent to and flush with the top cover of the book.

In a preferred embodiment of the present invention, as shown in FIG. 1, the testing device is permanently affixed to the protruded edge 4 of a specially programmed text book 1 which covers a specified topic and includes a quiz 7 (shown in FIG. 3) having question and answer data 8 at the end of each chapter. Each quiz 7 preferably comprises an alphabetic quiz code 9 in addition to 10 multiple choice questions, although any number of questions may be provided, with each question having four answers designated by the letters A, B, C and D. The device itself comprises a rectangular housing 6 having a front panel with an input section comprising four input keys 21 lettered A, B, C and D for entering the quiz code 9 and selecting one of the possible answers and an output section comprising a display means 17 and an audible means 16 for providing feedback as to the correctness of the selected answer.

Figure 8A:
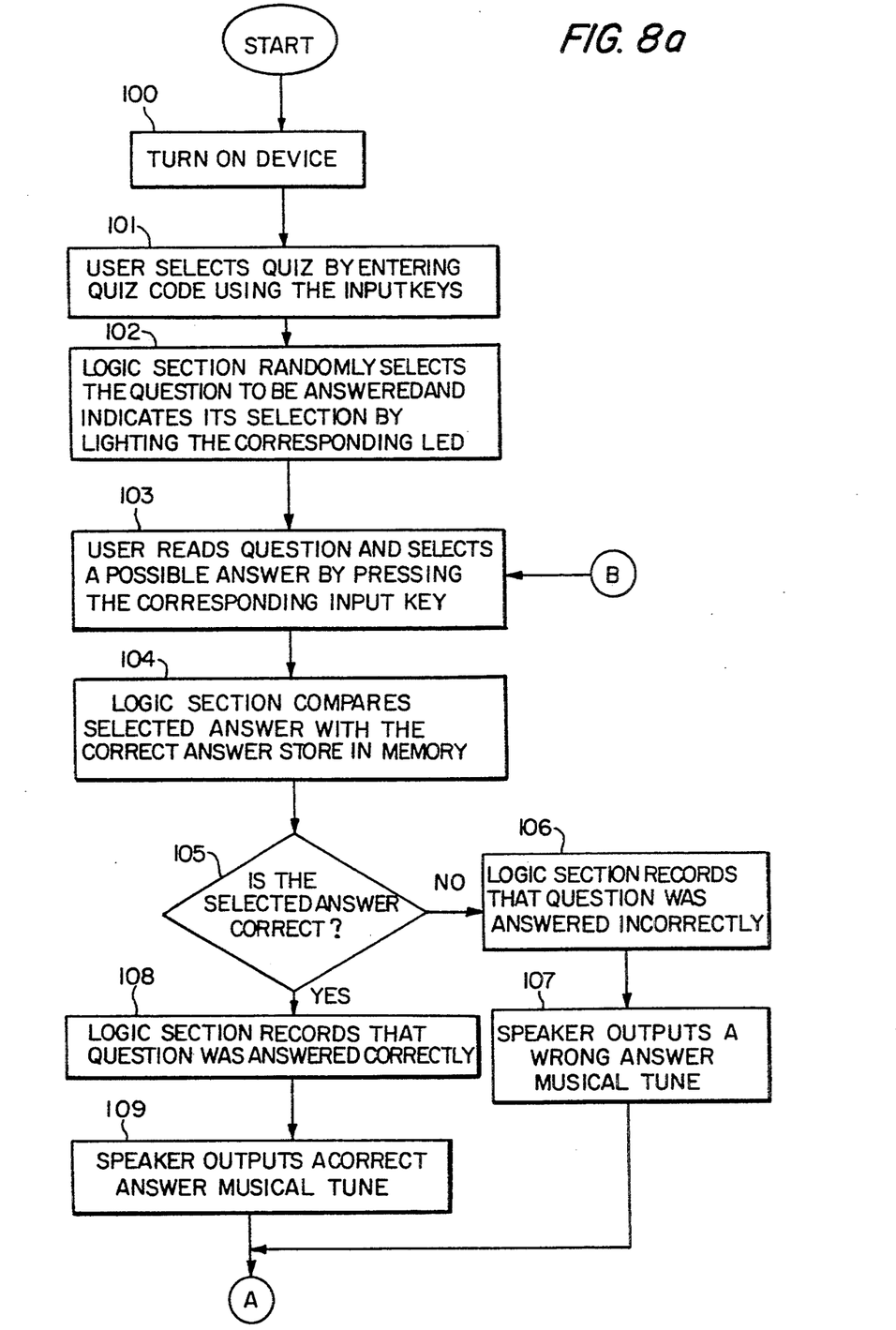
FIGS. 8a and 8b form a flow chart describing the operation of the electronic testing device.
Figure 8B:
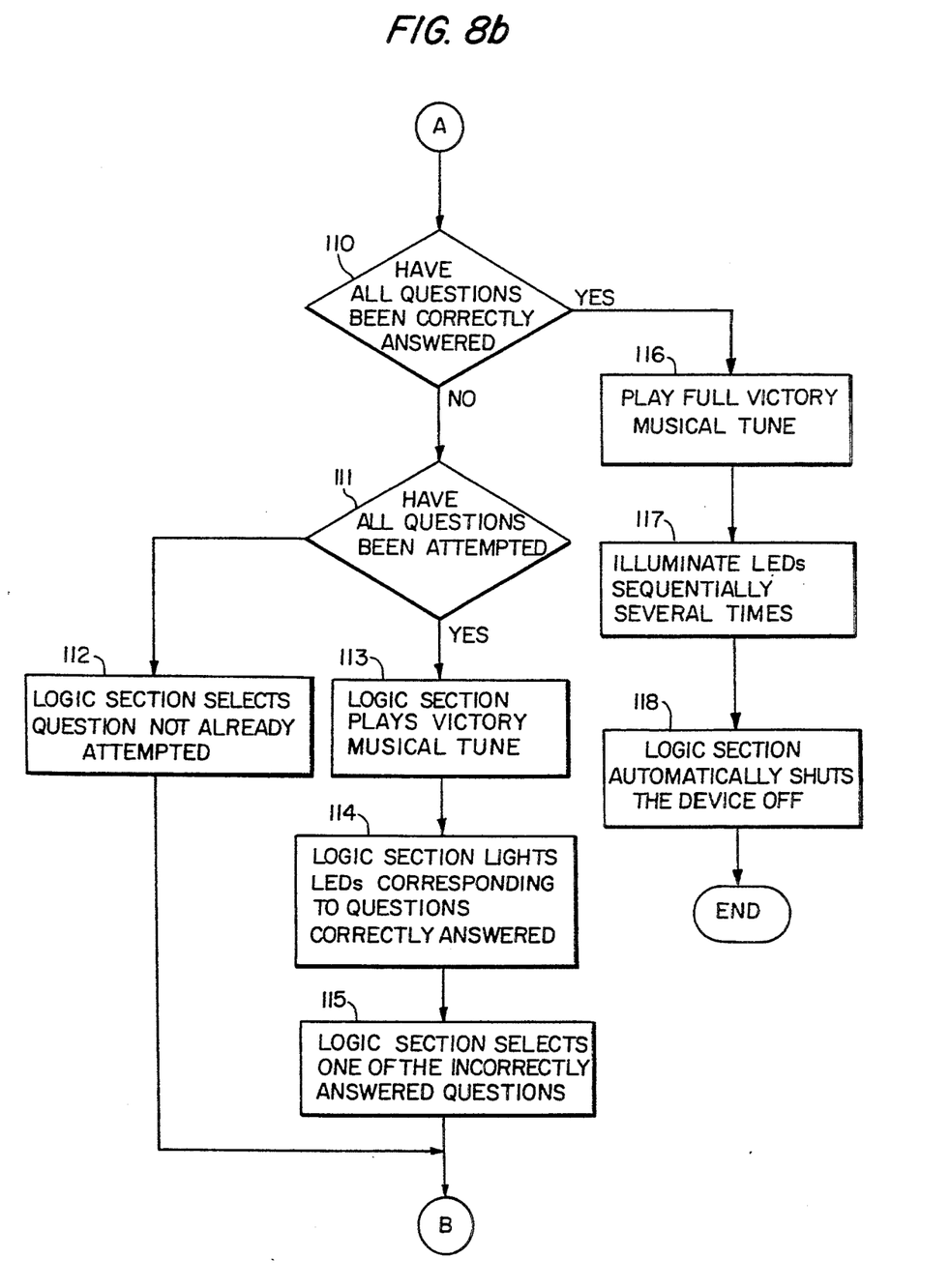

With respect to the operation of this embodiment as shown in the algorithm of FIGS. 8a and 8b, the quiz code 9 is initially entered using the input keys 21 after the ON/OFF button 22 has been activated. Once the quiz 7 has been selected, the display means 17 of the output section forming a plurality of LEDs 17 sequentially disposed in a vertical arrangement along the side of the device and adjacent to the book 1 are utilized to indicate which one of a plurality of questions similarly arranged in the book 1 is to be answered first. (As an alternative, an LCD display may be utilized to display the number of the selected question.) The logic section randomly selects one of the questions (shown in FIG. 3) for the user to answer and lights the corresponding LED adjacent to that question. Alternatively, the logic section may select the questions pursuant to a logical relationship between the questions based on the relatedness of the subject matter of the various questions. The user then reads the designated question and selects one of the possible answers by pressing the input key 21 having the same letter as the selected answer.

The logic section comprising a microprocessor 25 and associated memory compares the selected answer with the correct answer permanently stored in memory via programming at the factory. If the answer is correct, the audible means 16 comprising a speaker 16 and associated circuitry will play a "right answer" musical tune and the logic section subsequently selects another (previously unanswered) question at random. If a wrong answer is selected by the user, the audible means will play a "wrong answer" musical tune, and after a random search period in a random search mode (where all the LEDS are randomly lighted and a variety of tunes are randomly played), the logic section selects the next question to be answered by lighting an associated LED. (Alternatively, the logic section may be configured such that the user must keep inputting answers for a particular question until the question is correctly answered.) If no answer is keyed in, a warning beep will sound after approximately one minute. This embodiment may alternately include a timing circuit 29 so as to provide an adjustable preset time for response, after which time the logic section will treat the lack of input as a wrong answer and the device will play the "wrong answer" tune.

The user continues to answer the questions until all 10 of them have been answered either correctly or incorrectly, at which time either a partial victory song is played indicating that not all the user-selected answers are correct or a full victory song will be played indicating the user properly selected all the correct answers. The device then displays all questions answered incorrectly (or in the alternative, all the correctly answered questions) by sequential lighting of their associated LEDs so as to indicate the user's score and the particular questions which he has incorrectly (or correctly) answered. After a short time, the device then randomly selects the incorrectly answered questions one at a time for the user to try his aptitude again. This reselection of the incorrectly answered questions continues until all of the questions have been correctly answered, at which time a "full victory" musical tune is played and all question-indicating LEDs are sequentially illuminated several times. The device subsequently turns itself off and remains off until the ON/OFF button 22 is pressed once again. Alternatively, this embodiment may further include a LCD or LED display 18 for displaying at the end of a quiz session the number of each question for which an incorrect answer was initially selected, the total number of questions correctly answered in the first round and/or a percentage score for a particular quiz 7 or several quizzes 7 together.

Figure 9:
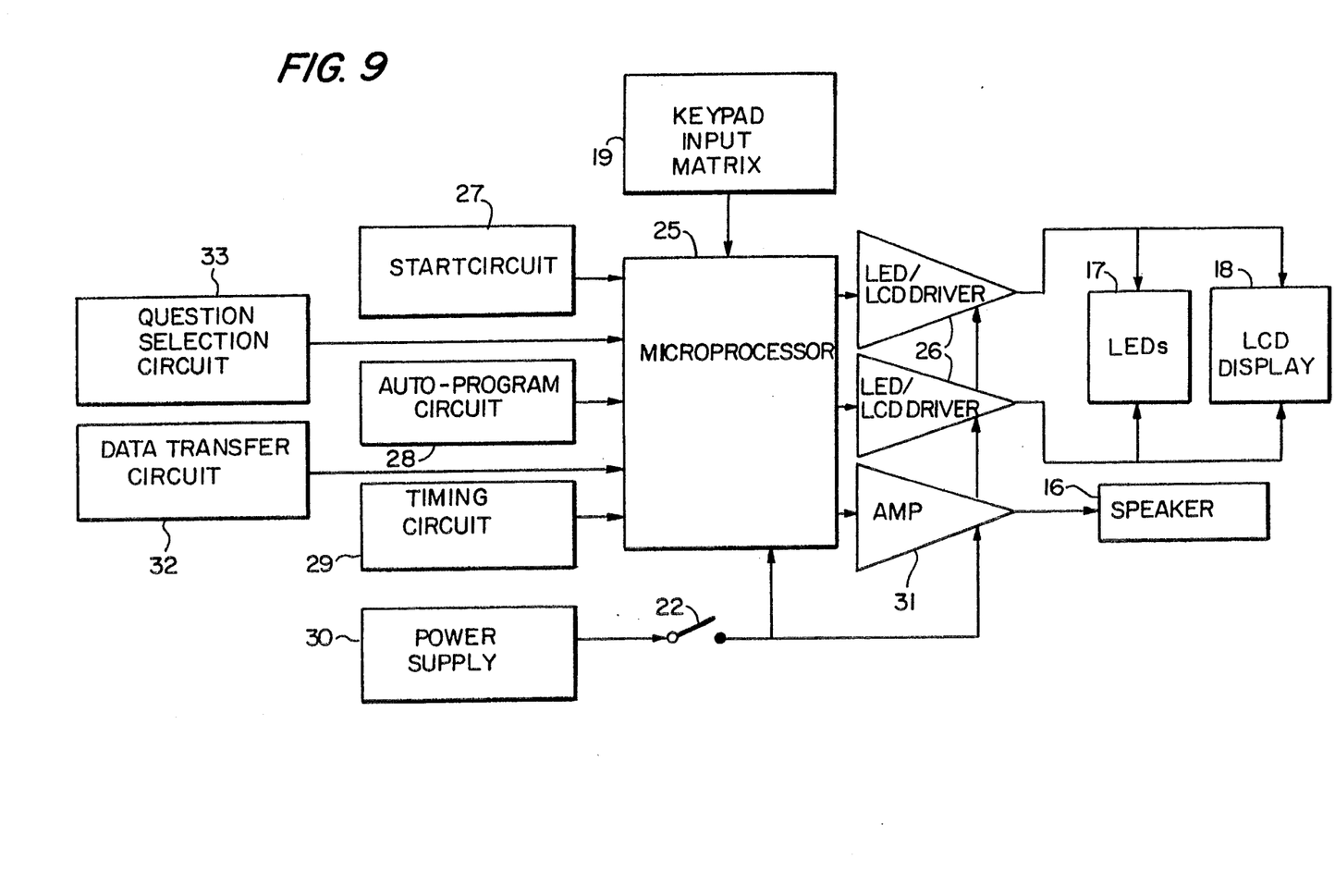
FIG. 9 is a schematic block diagram of one embodiment of the electrical components and their connections forming the input, output and logic sections of the electronic testing device.

With reference to FIG. 9, a block diagram of one embodiment of the electronic circuit which controls each of the input section, the display section and the logic section is illustrated. The circuit comprises a microprocessor 25 manufactured by Zilog under the chip family No. Z-86C08. The microprocessor 25 includes memory components for storing information, as well as control and signal circuits for extracting the information when called for by the user through the keyboard 21. The microprocessor 25 is operated in accordance with an oscillator circuit 29 serving as a clock pulse generator, and power is supplied to the electrical circuit by means of four AAA batteries controlled by a power switch on the front panel of the device. A start circuit 27 starts the device when power is turned on via the power switch. The necessary input information is entered into the microprocessor 25 through use of the keys 21 and an associated keypad input matrix 19. The audible signal output from the microprocessor 25 is provided to a loudspeaker 16 via a conventional amplifier 31. To generate the visual displays of the present invention, the visual signals output from the microprocessor 25 are preferably supplied directly to either or both of an LCD display 18 or the LEDs appearing on the left hand side of the device's front panel. However, according to another embodiment shown in FIG. 9, the visual signals may be supplied through LED/LCD drivers 26 to amplify the signals before reaching the LCD display 18 or the LED's. The microprocessor 25 is a single component microcomputer employing an arithmetic section containing basic data manipulation functions and includes many sections such as an arithmetic logic unit, a memory register, and an instruction decoder. In a typical operation, data stored in the memory register is combined in the arithmetic logic unit with data 8 from another source on the internal bus, such as another register, and the result is stored in one of the registers.

Figure 7:
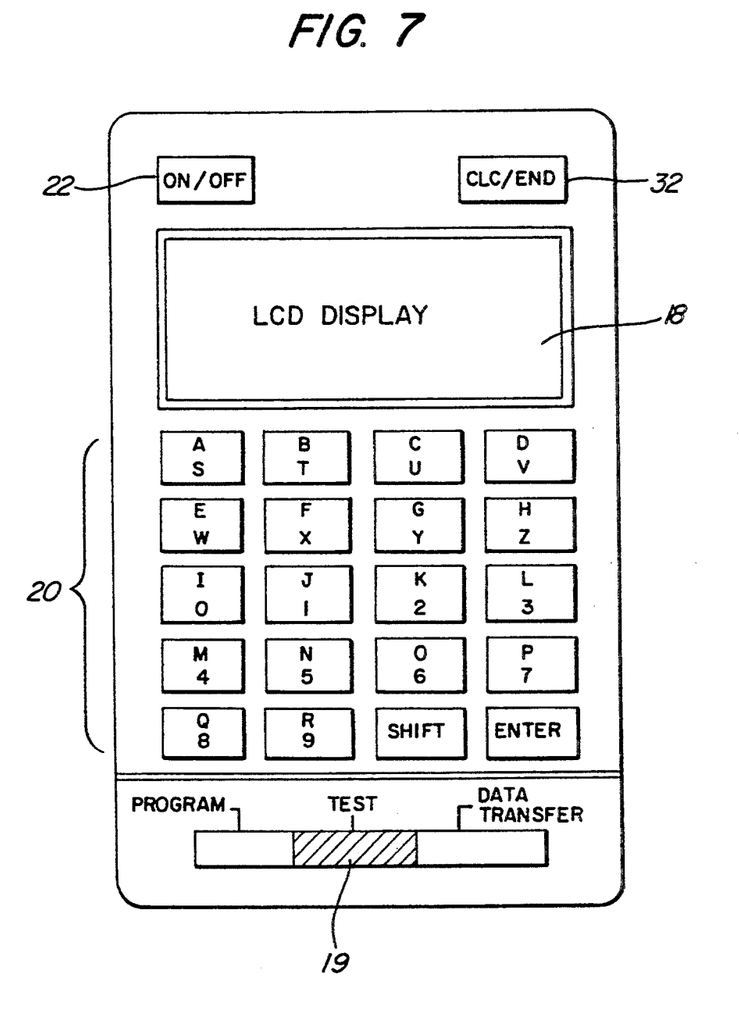
FIG. 7 is a top plan view of one embodiment of the input section and the visual output section of the electronic testing device showing the alphanumeric key pad and the LCD display screen.

According to an alternate embodiment of the present invention, the device can be adapted to function with a variety of different quiz formats including multiple choice questions, fill-in the blank questions, calculating questions (where the user is required to formulate a single, specific answer such as a mathematical result) and matching questions (where the question forms a first piece of data (i.e. the name of a country) to be matched with a one of a plurality of second data pieces (i.e. visual illustrations of several countries)). In this manner, the testing device can be applied to a greater variety of pre-existing testing materials which do not rely only upon multiple choice questions. This feature is implemented through the use of an alphanumeric keypad 20 (shown in FIG. 7) having 18 input keys and an associated shift key for entering both letter and number sequences as input to formulate the specific answer strings required by a particular quiz 7. Without using the shift key, the letters A through R, for example, may be entered simply by pressing the keys corresponding to those letters which letters are displayed proximate to the keys in a first color. However, by using the shift key in conjunction with the 18 keys, the letters S through Z and the numbers 0 through 9 displayed in a second color may be entered as input.

In conjunction with the above-described alternate embodiment, the device may be further adapted with an LCD display 18 screen (also shown in FIG. 7) capable of displaying answers comprising a plurality of characters. In this manner, the user may enter entire words or phrases and check the display to ensure the correct spelling of the selected answer. Additionally, after each or all of the questions have been answered, the logic section of the device can be programmed to review the incorrectly answered questions and provide as output to the display screen the correct answer of each incorrectly answered question.

In another alternate embodiment of the present invention, the device is adapted for use with quizzes 7 of one or more already existing text books or other materials such as classroom examinations or handouts. This is accomplished by implementing a logic section having a programming mode in conjunction with the above-described testing mode which modes can be selected through use of a selector switch 19 of the input section. To enable the use of the device in conjunction with preexisting quizzes 7, a proctor or teacher first programs the device by selecting the programming mode and entering information regarding the specific text book 1, quiz 7 and questions which the user will answer. The device initially outputs to the display screen 18 the string "Text 1" which indicates to the programmer that he should input the number or title designating the specific book 1 containing the selected quiz 7. After inputting the text book 1 designator and pressing the ENTER button, the microprocessor 25 then prompts the programmer for a quiz code 9 or the page number on which the quiz 7 begins in the specified book 1 by outputting the string "Quiz 1" on the same display screen 18. Once the quiz code 9 has been entered, the programmer is next prompted with the display of "Q1" indicating that he should now input the correct answer corresponding to the first question of the designated quiz 7. After the programmer has input the first correct answer and presses ENTER, the microprocessor sequentially prompts the programmer in the same manner for the correct answers to the subsequent questions of the quiz 7 (i.e. Q2, Q3, Q4, etc.), storing each in an appropriate location in memory for recall during comparison with the user's selected answers.

Once all the correct answers to a quiz 7 have been programmed into the device, the programmer then presses the CLR/END button 32 to indicate that no more questions follow. The microprocessor 25 then displays the string "Quiz 2" to prompt the user for the code 9 of the next quiz 7 of the same book 1 which the programmer desires to enter. If no other quizzes 7 are to be programmed, the programmer presses CLR/END and the microprocessor 25 then displays the string "Text 2" prompting the programmer for the designator of the next book 1. If no other books 1 are to be programmed, the programmer simply enters CLR/END again and the microprocessor 25 finally displays the string "ready" to signal that all the information has been correctly input and that testing may now begin upon selecting the testing mode. When the testing mode is subsequently selected, the logic section then prompts the user for the text designator and the quiz code 9 so that the proper questions can be invoked from the microprocessor's memory for testing. By means of the above-described programming mode, a plurality of quizzes 7 from either one or many text books may be programmed into the device for subsequent testing either at home or in a classroom setting.

Furthermore, in order to facilitate the programming of several testing devices as would be required for use of the device in a classroom setting, the logic section may be configured with a data transfer circuit 32 and a corresponding transfer mode implemented by means of the aforementioned selector switch 19. The programmer would follow the above described programming sequence in preparation of a first device and then couple the first programmed device with a second device through an interface adapter or a plurality of transmission lines. The selector switch 19 is then placed in the data transfer mode where the data transfer circuit 33 interfaces with the microprocessor 25 of both devices to initiate a transfer of the programmed information, including text book designators, quiz codes 9 and correct answers. In this manner, the programmed information can be transferred in a very short time from the memory of the microprocessor 25 of the first device to the memory of the microprocessor 25 of the second device. The second device can then be used for testing by simply selecting the testing mode and entering the required text designator and quiz code 9.

Pursuant to the adaptation of the device for classroom use, a plurality of the devices may be easily programmed through use of the above-described data transfer mode and then handed out to the students for entering answers corresponding to homework questions or questions from an in-class exam. In order to keep track of the questions that are answered correctly for purposes of grading (or identifying which questions a student has difficulty with), the device may be further adapted with a score recording circuit (not shown). This score recording circuit designates in one of the memory storage means the questions which the student answered correctly and prevents the student from modifying the recordation by requiring the input of a password which then enables the password holder to review the score or delete the recordation altogether.

While the invention has been described in conjunction with the preferred embodiment, it is evident that numerous alternatives, depictions, variations and uses will be apparent to those skilled in the art in light of the foregoing description. Specifically, the testing device of the present invention can be used in conjunction with a multitude of books and other materials so as to enable its use in a vast number of testing environments including but not limited to self-study, take-home assignments, classroom examinations and in-class work.

I claim:

1. An electronic testing device for use in conjunction with a plurality of different educational books, each book consisting of only a front cover, a back cover, and a plurality of bound pages having at least one quiz with a plurality of questions for testing the reading comprehension of a user, the device comprising:

a housing;

means on the housing for removable attachment to a back cover of any one of the books; and means for designating a..specific book, the housing including an output section comprising a display means for designating a particular book out of the plurality of books, a particular quiz out of a plurality of quizzes and questions of the particular quiz to be answered by the user and an audible means for producing audible tones indicating the correctness of answers selected by the user in response to the designated questions;

an input section comprising a key pad having a plurality of alphabetic and numeric keys for entry of the selected answers to the testing device; and a logic section comprising a microprocessor, a first memory means and a second memory means, the microprocessor comprising at least a first programming mode of operation for storing in the first memory means a plurality of book designators identifying each of the plurality of educational books, a plurality of quiz codes identifying each of the plurality of quizzes and a plurality of correct answers corresponding to questions of the plurality of quizzes and a second testing mode of operation for storing in the second memory means the selected answers input by the user in response to the questions of the particular quiz and for comparing the selected answers with the correct answers of the particular quiz stored in the first memory means wherein the display means for the output section comprises a plurality of LED lights disposed vertically on a front panel of the housing corresponding to the designated questions similarly disposed on a page of the particular book comprising the particular quiz.

2. The testing device of claim 1, wherein the housing is removably attached to a protruded portion of the back cover extending beyond an edge of the particular book using a fastener selected from the group comprising clamps, clips, hook and loop fasteners, cords, elastic bands, corresponding hinge members and corresponding track and guide members.

3. The testing device of claim 1, wherein the back cover of the particular book comprises a reception cavity for disposition of the housing between the front and back covers of the book.

4. The testing device of claim 1, wherein the housing is pivotally attached to the back cover of the particular book by a rotatable coupling between the housing and the back cover, the rotatable coupling comprising a coupling selected from the group consisting of hinges, wire rings, elastic ribbons, flexible strips of fabric and corresponding strips of hook and loop fasteners.

5. The testing device of claim 4, wherein the particular book comprises a binding disposed at a first edge of the particular book for coupling pages of the particular book between the front and back covers, the back cover having an embossed portion raised between the front and back covers with a reception cavity formed within the embossed portion proximate to a second edge of the particular book opposite the first edge, the housing being pivotally attached to the back cover proximate to the second edge for rotation of the housing from an operating position adjacent to the second edge of the particular book to a stored position within the reception cavity.

6. The testing device of claim 1, wherein the particular book comprises a binding disposed at a first edge of the particular book for coupling pages of the book between the front and back covers, the back cover having an embossed portion raised between the front and back covers with a reception cavity formed within the embossed portion proximate to a second edge of the particular book opposite the first edge, the housing being slidably coupled to the back cover with corresponding track and guide members disposed on the back cover and the housing, respectively.

7. The testing device of claim 1, wherein the display means of the output section comprises an LCD display screen for visual display of alphabetic and numeric characters forming the correct answers programmed into the testing device by the user and the selected possible answers entered in response the questions of the particular quiz.

8. The testing device of claim 1, wherein the microprocessor comprises selection means for selecting a particular set of correct answers stored in the first memory means upon entering a particular book designator and a particular quiz code, comparison means for sequentially comparing the particular set of correct answers with the selected answers stored in the second storage means and response means for producing a response signal in response to the comparison, the logic section comprising circuit means operated under control of the microprocessor to supply the response signals to both the display and audible means of the output section to indicate the correctness of the selected answer.

9. The testing device of claim 1, wherein the microprocessor comprises data transfer means forming a third data transfer mode of operation for transferring the book designators, the quiz codes and the correct answers corresponding to the questions of the plurality of quizzes stored in the first memory means to another similar testing device for storage in a second memory means of the similar testing device upon electrical connection of the logic sections of the two devices.

10. The testing device of claim 1, wherein the housing is pivotally attached to the cover of the book.

11. The testing device of claim 1 wherein the housing is attached to the cover of the book by track and guide members.

12. The testing device of claim 1 further including a code printed in the book corresponding to the quiz and means for converting the key pad to initially enter the code prior to the enabling of the key pad to enter the user's selected answers.

13. A combination electronic testing device and educational book, the book having a plurality of pages with a plurality quizzes with a plurality of questions for testing the reading comprehension of a user, the combination comprising:

> a front cover and back cover connected to the pages, the back cover being larger than the front cover and extending beyond the pages;
>
> a housing attached to the back cover;
>
> a separate printed code positioned on each page having a quiz;
>
> a microcomputer circuit mounted in the housing including stored data relevant to the quizzes;
>
> a series of keys provided on the housing to enter data into the microcomputer circuit;
>
> a series of light indicators spaced along the housing to designate a corresponding section of a quiz in response to the microcomputer circuit;
>
> first means for enabling the keys to permit the user to enter a printed code corresponding to a specific quiz;
>
> second means for enabling the keys to permit the user to designate a specific answer to a question of a specific quiz, indicated by a light indicator;
>
> means for comparing the stored data with the designated specific answer to determine if the user has designated a correct answer;
>
> means for displaying a correct answer and a wrong answer;
>
> means for storing an indication of a wrong answer;
>
> means for displaying the number of correct answers; and
>
> means for activating the light indicators to repeat questions corresponding to the wrong answers until all of the designated answers by the user are found by the comparing means to be correct.

* * * * *